United States Patent
Obana et al.

(10) Patent No.: US 11,220,136 B2
(45) Date of Patent: Jan. 11, 2022

(54) STEEL CORD FOR REINFORCING RUBBER ARTICLE, METHOD FOR MANUFACTURING SAME, AND TIRE

(71) Applicant: BRIDGESTONE CORPORATION, Tokyo (JP)

(72) Inventors: Naohiko Obana, Tokyo (JP); Mikito Kondo, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 175 days.

(21) Appl. No.: 16/663,557

(22) Filed: Oct. 25, 2019

(65) Prior Publication Data

US 2020/0055341 A1 Feb. 20, 2020

Related U.S. Application Data

(63) Continuation of application No. PCT/JP2018/015257, filed on Apr. 11, 2018.

(30) Foreign Application Priority Data

Apr. 28, 2017 (JP) .............................. JP2017-090759

(51) Int. Cl.
*B60C 9/00* (2006.01)
*D07B 1/06* (2006.01)

(52) U.S. Cl.
CPC .......... *B60C 9/0007* (2013.01); *D07B 1/0613* (2013.01); *B60C 2009/0085* (2013.01);
(Continued)

(58) Field of Classification Search
CPC .. D07B 1/0606; D07B 1/0613; D07B 1/0673; D07B 1/0693; D07B 2201/1044;
(Continued)

(56) References Cited

U.S. PATENT DOCUMENTS 4,947,636 A * 8/1990 Sinopoli .............. D07B 1/0613
57/218
4,947,638 A * 8/1990 Nagamine ............. B60C 9/0007
152/451

(Continued)

FOREIGN PATENT DOCUMENTS

CN 101044284 A 9/2007
CN 102330370 A 1/2012
(Continued)

OTHER PUBLICATIONS

Extended European Search Report dated Jan. 20, 2021 from the European Patent Office in Application No. 18 79 0823.

(Continued)

*Primary Examiner* — Shaun R Hurley
(74) *Attorney, Agent, or Firm* — Sughrue Mion, PLLC

(57) ABSTRACT

Provided is a multi-twisted steel cord for reinforcing a rubber article, the steel cord having cord strength with a small loss as compared to the total strength of filaments constituting the cord and a high rubber penetration. The steel cord includes a plurality of twisted strands in a multi-twisted structure, each strand including a plurality of twisted filaments in two or more layers, in which at least some of the filaments have a tensile strength of 3,000 MPa or more, the steel cord satisfying a filament occupancy of 48% or more and less than 54%, a cord twist angle of 78° or more and less than 84°, an average crossing angle between adjacent filaments other than wrapping filaments of less than 17°, and a gap between adjacent sheath filaments constituting the strand of 0.065 mm or more.

19 Claims, 3 Drawing Sheets

(52) U.S. Cl.
CPC ............. *B60C 2009/0092* (2013.01); *D07B 2201/1044* (2013.01); *D07B 2201/2006* (2013.01); *D07B 2501/2046* (2013.01)

(58) Field of Classification Search
CPC .... D07B 2201/2006; D07B 2501/2046; B60C 9/0007
See application file for complete search history.

(56) References Cited

U.S. PATENT DOCUMENTS

| | | | | |
|---|---|---|---|---|
| 5,461,850 | A * | 10/1995 | Bruyneel | D07B 1/0613 57/212 |
| 6,863,103 | B1 * | 3/2005 | Masubuchi | B60C 9/0007 152/451 |
| 9,004,128 | B2 * | 4/2015 | Nakamura | B60C 9/0007 152/450 |
| 10,017,011 | B2 * | 7/2018 | Fukuda | D02G 3/48 |
| 10,105,991 | B2 * | 10/2018 | Suzuki | B60C 9/00 |
| 10,906,353 | B2 * | 2/2021 | Nozaki | D07B 1/0613 |
| 2008/0028740 | A1 | 2/2008 | Ushijima | |
| 2009/0205308 | A1 * | 8/2009 | Aoyama | B60C 9/0007 57/212 |
| 2010/0038112 | A1 * | 2/2010 | Grether | H01B 13/02 174/128.1 |
| 2011/0088825 | A1 * | 4/2011 | Kudo | B60C 9/0007 152/451 |
| 2011/0209808 | A1 * | 9/2011 | Nakamura | B60C 9/0007 152/527 |
| 2012/0043003 | A1 * | 2/2012 | Masubuchi | B60C 9/18 152/556 |
| 2013/0032264 | A1 * | 2/2013 | Cheng | D07B 1/0646 152/451 |
| 2013/0248074 | A1 | 9/2013 | Oyama | |
| 2013/0272914 | A1 | 10/2013 | Takeda et al. | |
| 2015/0329995 | A1 | 11/2015 | Clement et al. | |
| 2015/0368859 | A1 | 12/2015 | Nishimura et al. | |
| 2016/0152082 | A1 * | 6/2016 | Wang | B60C 9/2006 152/527 |
| 2017/0210170 | A1 * | 7/2017 | Nozaki | B60C 9/00 |
| 2017/0211229 | A1 * | 7/2017 | Nozaki | B60C 9/00 |
| 2019/0234016 | A1 * | 8/2019 | Nozaki | B60C 9/2006 |

FOREIGN PATENT DOCUMENTS

| | | |
|---|---|---|
| CN | 103370468 A | 10/2013 |
| CN | 104854274 A | 8/2015 |
| JP | 08-170283 A | 7/1996 |
| JP | 2000-103203 A | 4/2000 |
| JP | 2000-192379 A | 7/2000 |
| JP | 2001-011784 A | 1/2001 |
| JP | 2008-025050 A | 2/2008 |
| JP | 2009-179901 A | 8/2009 |
| WO | 2009/151127 A1 | 12/2009 |
| WO | 2014/129300 A1 | 8/2014 |
| WO | 2016/017654 A1 | 2/2016 |
| WO | 2019/122721 A1 | 6/2019 |

OTHER PUBLICATIONS

International Search Report for PCT/JP2018/015257 dated Jun. 19, 2018 [PCT/ISA/210].

* cited by examiner

STEEL CORD FOR REINFORCING RUBBER ARTICLE, METHOD FOR MANUFACTURING SAME, AND TIRE

CROSS REFERENCE TO RELATED APPLICATIONS

The present application is a continuation of PCT/JP2018/015257 filed Apr. 11, 2018 which claims priority to Japanese Patent Application No. JP2017-090759 filed Apr. 28, 2017, the disclosures of which are incorporated herein by reference.

TECHNICAL FIELD

The present invention relates to a high-strength steel cord for reinforcing a rubber article, which steel cord has a multi-twisted structure, a method for manufacturing the same, and a tire.

BACKGROUND ART

Multi-twisted steel cords are used for reinforcement of rubber articles including tires for construction and mining vehicles. Recently, studies have been made for reducing the weight of rubber articles such as tires by reducing the thickness of the reinforcement layer containing a steel cord through simplification of the cord structure or reduction of the cord diameter. In order to reduce the weight while ensuring the strength required for reinforcement, various research and development have been carried out to increase the strength of multi-twisted steel cords.

However, even when the strength of individual filaments constituting a multi-twisted steel cord is increased, it has been difficult to obtain cord strength commensurate with it. Thus, a steel cord has been demanded, which has cord strength with a small loss as compared to the total strength of the filaments constituting the cord.

Due to a tire getting over a sharp obstacle or the like, a tear reaching the reinforcement layer may be caused. Water that entered from the tear may lead to rusting of the steel cords and thus to a reduction in strength. In order to prevent that, steel cords are required to be rustproof. For this, multi-twisted cords are required to have a high rubber penetration by forming a gap between adjacent filaments, through which rubber can penetrate.

With respect to multi-twisted steel cords, a steel cord for reinforcing a rubber article has been disclosed, in which the twist direction of the outermost sheath filaments constituting a strand and the twist direction of the sheath strands are the same (Patent Document 1).

RELATED ART DOCUMENT

Patent Document

Patent Document 1: JPH08-170283A

SUMMARY OF THE INVENTION

Problems to be Solved by the Invention

The steel cord for reinforcing a rubber article disclosed in the patent document 1 has an improved cord strength obtained by specifying the twist directions of the filaments and the strands. However, there has been a continuing demand for steel cords having higher strength, and it has particularly been demanded that the cord strength loss as compared to the total strength of the filaments constituting the cord be small. In addition, there has also been a demand for the steel cords having a high rubber penetration.

Thus, an object of the present invention is to provide: a steel cord for reinforcing a rubber article, which steel cord is multi-twisted, has cord strength with a small loss as compared to the total strength of filaments constituting the cord and has a high rubber penetration a method for manufacturing the steel cord, and a tire using the steel cord.

Means for Solving the Problems

The present inventors have intensively studied on multi-twisted steel cords to find that adjustment of the cord twist angle and the crossing angle between adjacent filaments into a predetermined range, and adjustment of the filament occupancy and the gap between specific filaments can provide a steel cord for reinforcing a rubber article, which steel cord has cord strength with a small loss as compared to the total strength of filaments constituting the cord and a high rubber penetration, thereby completing the present invention.

Thus, a steel cord for reinforcing a rubber article of the present invention includes a plurality of twisted strands in a multi-twisted structure, each strand having a plurality of twisted filaments in two or more layers, wherein at least some of the filaments have a tensile strength of 3,000 MPa or more, and wherein the steel cord satisfies the following:

a filament occupancy of 48% or more and less than 54%;

a cord twist angle of 78° or more and less than 84°;

an average crossing angle between adjacent filaments other than wrapping filaments of less than 17°; and a gap between adjacent sheath filaments constituting the strand of 0.065 mm or more.

In the steel cord for reinforcing a rubber article of the present invention, the average crossing angle between adjacent filaments are preferably less than 14°.

Preferably, the multi-twisted structure is a 1+n (n=6 or 7) structure including one core strand and six to seven sheath strands twisted around the core strand.

Preferably, a twist direction of the sheath filaments of the core strand is opposite to a twist direction of the sheath filaments of the sheath strands.

Preferably, a twist direction of sheath filaments of one sheath strand is opposite to a twist direction of sheath filaments of another sheath strand adjacent thereto.

Preferably, a lamellar orientation angle in a surface layer portion of at least some of the filaments is 0.0° or more and 6.0° or less, or 12.5° or more and 18.5° or less.

A tire of the present invention is one in which the above-described steel cord for reinforcing a rubber article is used for reinforcement thereof.

In order to manufacture the above-described steel cord for reinforcing a rubber article having a plurality of twisted strands in a multi-twisted structure, each strand having a plurality of twisted filaments in two or more layers, a method for manufacturing the steel cord for reinforcing a rubber article of the present invention includes subjecting at least some of the filaments constituting the strand after a final wire drawing process to a stress relief annealing process at 250° C. or higher and lower than 300° C. after a final wire drawing process.

Preferably, in the method for manufacturing the steel cord for reinforcing a rubber article of the present invention, the stress relief annealing process is performed after the final wire drawing process without a leveling process.

Effects of the Invention

According to the present invention, a steel cord for reinforcing a rubber article, which steel cord is multi-twisted, has cord strength with a small loss as compared to the total strength of filaments constituting the cord and has a high rubber penetration; a method for manufacturing the steel cord; and a tire using the steel cord can be provided.

MODE FOR CARRYING OUT THE INVENTION

Hereinafter, a steel cord for reinforcing a rubber article of the present invention, a method for manufacturing the steel cord, and a tire using the steel cord will be described in more detail with reference to the drawings.

Figure 1:
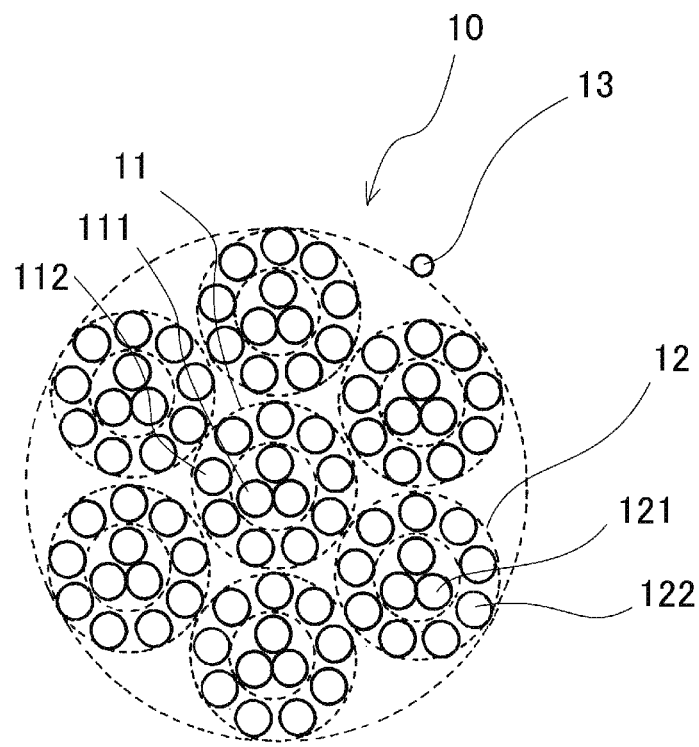
FIG. 1 is a cross-sectional view of a steel cord for reinforcing a rubber article in one embodiment of the present invention.

FIG. 1 is a cross-sectional view of a steel cord for reinforcing a rubber article in one embodiment of the present invention (hereinafter referred to as simply "steel cord") in a direction perpendicular to the longitudinal direction of the steel cord. The steel cord 10 shown in FIG. 1 is a cord having a multi-twisted structure including one core strand 11 and six sheath strands 12 which are twisted together, and has a cord structure of (3+9)+6×(3+9)+1. The outermost layer of the sheath strand 12 is wrapped with a wrapping filament 13. The core strand 11 has a two-layer twisted structure including three core filaments 111 and nine sheath filaments 112 around them, which are twisted together, while the sheath strand 12 has a two-layer twisted structure including three core filaments 121 and nine sheath filaments 122 around them, which are twisted together.

Figure 2:
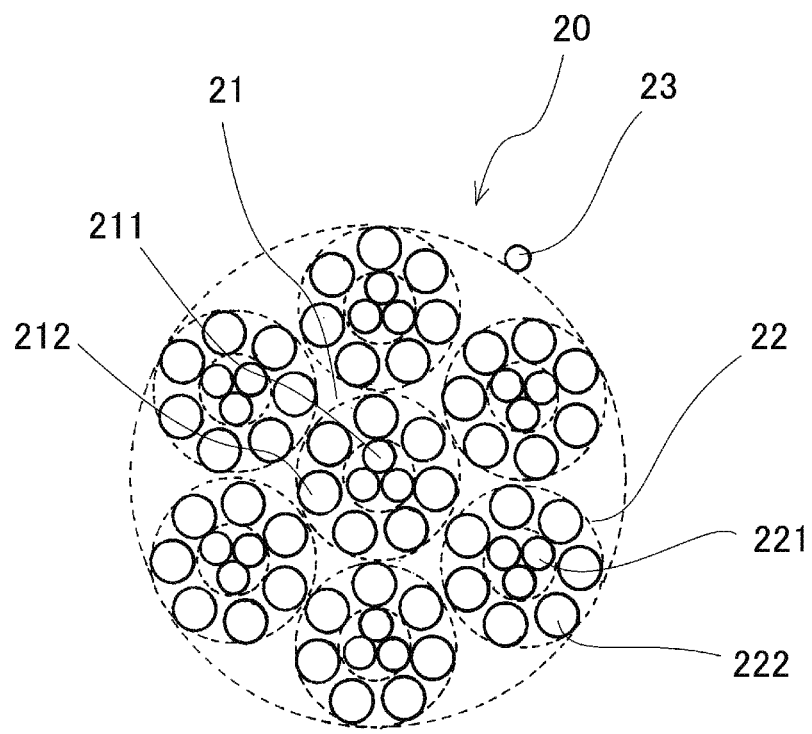
FIG. 2 is a cross-sectional view of a steel cord for reinforcing a rubber article in another embodiment of the present invention.

FIG. 2 is a cross-sectional view of a steel cord in another embodiment of the present invention in a direction perpendicular to the longitudinal direction of the steel cord. The steel cord 20 shown in FIG. 2 is a cord having a multi-twisted structure including one core strand 21 and six sheath strands 22 which are twisted together, and has a (3+7)+6×(3+7)+1 cord structure. The outermost layer of the sheath strand 22 is wrapped with a wrapping filament 23. The core strand 21 has a two-layer twisted structure including three core filaments 211 and seven sheath filaments 212 around them, which are twisted together, while the sheath strand 22 has a two-layer twisted structure including three core filaments 221 and seven sheath filaments 222 around them, which are twisted together.

The steel cord of the present invention is not restricted to the cord structures illustrated in FIGS. 1 and 2. Preferably, a 1+n (n=6 or 7) cord structure is used.

Characteristics of steel cords of the present invention described below are the same for the steel cord 10 in FIG. 1 and the steel cord 20 in FIG. 2, and steel cords in the other embodiments of the present invention. Thus, in the following description, embodiments of the present invention will be described, where the steel cord 10 illustrated in FIG. 1 is used for reinforcing a tire as a main representative example.

In the present embodiment, at least some of the filaments of the steel cord 10 have a tensile strength of 3,000 MPa or more. For example, the core filament 121 and the sheath filament 122 which form the sheath strand 12 of the steel cord 10 have tensile strengths of 3,000 MPa or more. When some of the filaments of the steel cord 10 have a tensile strength of 3,000 MPa or more, the steel cord 10 in the present embodiment can have an enhanced strength. From the viewpoint of enhancing the strength of the steel cord 10, all of the filaments constituting the steel cord 10 preferably have a tensile strength of 3,000 MPa or more.

The steel cord 10 in the present embodiment has a filament occupancy of 48% or more and less than 54%. The filament occupancy is a value expressed as a percentage obtained by dividing the total cross-sectional area of the filaments constituting the steel cord by the area of the circumcircle of the steel cord and multiplying the obtained value by 100. Thus, the filament occupancy (%)=(total cross-sectional area of the filaments constituting the steel cord)/(area of the circumcircle of the steel cord)×100.

When the filament occupancy is in a range of 48% or more and less than 54%, the steel cord can have an enhanced strength with a high filament packing efficiency and achieve a high rubber penetration. When the filament occupancy is less than 48%, the diameter of the steel cord 10 for achieving the strength required for the steel cord 10 is increased due to the low filament packing efficiency. This results in thickening of the rubber reinforcement layer when the steel cord 10 is used for reinforcing a tire. Thus, such filament occupancy is disadvantageous in view of tire weight saving. When the filament occupancy is 54% or more, the gap between adjacent filaments described later is decreased, which results in poor rubber penetration. A preferred filament occupancy is 48% or more and less than 50%.

Figure 3:
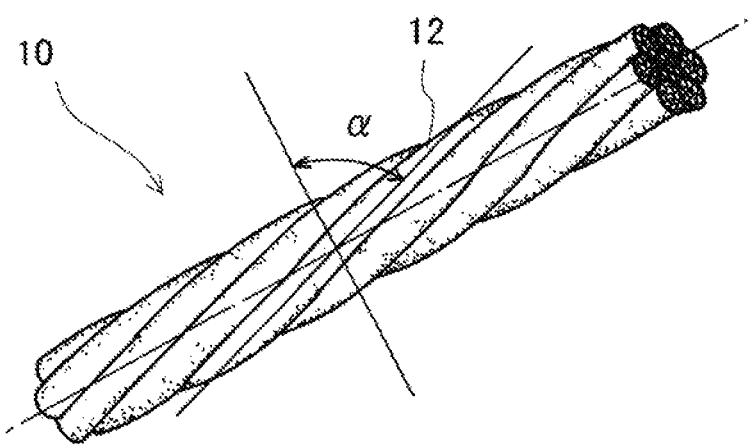
FIG. 3 illustrates a cord twist angle.

The steel cord 10 of the present embodiment has a cord twist angle of 78° or more and less than 84°. As illustrated in FIG. 3, the cord twist angle a is an angle formed by the direction perpendicular to the longitudinal direction of the steel cord, and the direction along the longitudinal direction of a strand (which refers to the sheath strand 12 in the case of the steel cord 10 in FIG. 1). The cord twist angle may be measured from the steel cord, or may be calculated from the cord diameter, the strand diameter, and the strand twist pitch of the steel cord.

When the cord twist angle is in a range of 78° or more and less than 84°, a steel cord having a small strength loss due to twisting and stable twist properties can be obtained. When the cord twist angle is less than 78°, the twisting is strong and the strength loss due to twisting becomes too large that the steel cord cannot obtain a predetermined strength. Here, the strength loss due to twisting means a value obtained by subtracting the percent cord strength exhibition (%) from 100. Thus, the strength loss due to twisting is as following:

Strength loss due to twisting (%)=100−percent cord strength exhibition.

The percent cord strength exhibition is a value expressed as a percentage obtained by dividing the strength of the steel cord by the total strength of the filaments constituting the steel cord and multiplying the obtained value by 100. Thus, the percent cord strength exhibition is as following:

Percent cord strength exhibition (%)=(strength of steel cord)/(total strength of filaments constituting steel cord)×100.

Preferably, the percent cord strength exhibition is 90% or more. When the percent cord strength exhibition is larger, or when the strength loss due to twisting is smaller, the steel cord can have a cord strength with smaller loss as compared to the total strength of the filaments constituting the cord. When the cord twist angle is 84° or more, the twisting is weak and the twist properties become unstable. Preferably, the cord twist angle is 80° or more and less than 84°.

Figure 4:
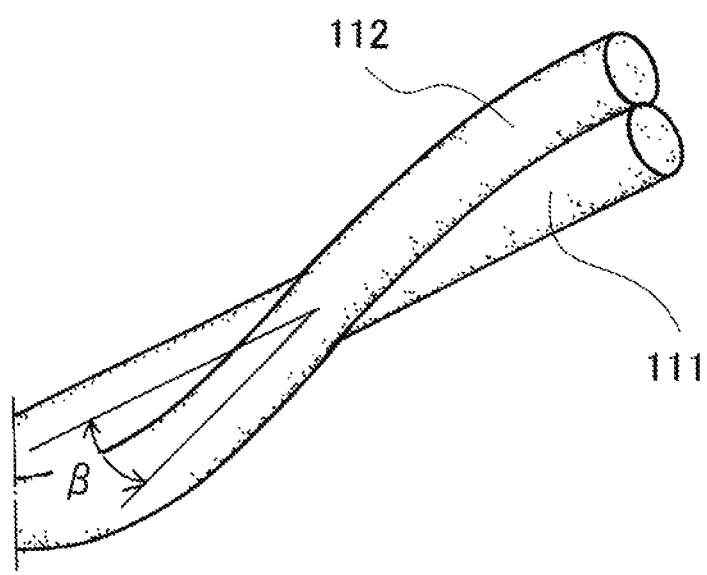
FIG. 4A illustrates a crossing angle between adjacent filaments.
FIG. 4B illustrates a crossing angle between sheath filaments of adjacent strands.
Figure 4:
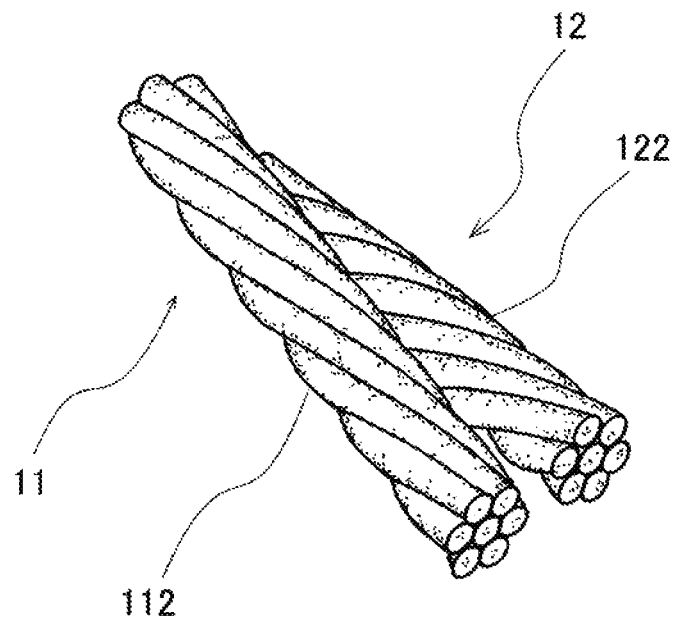

In the present embodiment, the steel cord 10 has an average crossing angle between adjacent filaments other than wrapping filaments of less than 17°. When the average crossing angle between adjacent filaments is less than 17°, the strength loss due to twisting can be reduced. For illustration of the crossing angle between adjacent filaments, FIG. 4A shows an exemplary crossing angle β between the core filament 111 and the sheath filament 112 of the core strand 11. For illustration of the crossing angle between sheath filaments of adjacent strands, FIG. 4B shows an embodiment of the sheath filament 112 of the core strand 11 and the sheath filament 122 of the sheath strand 12. As shown in FIGS. 4A and 4B, the crossing angle refers to an angle formed by the longitudinal direction of one filament and the longitudinal direction of another filament adjacent to the former filament. The average crossing angle of the steel cord 10 refers to the average of all crossing angles between adjacent filaments, such as the crossing angle between adjacent core filaments 111, the crossing angle between adjacent sheath filaments 112, and the crossing angle between a core filament 111 and a sheath filament 112 of a core strand 11, the crossing angle between adjacent core filaments 121, the crossing angle between adjacent sheath filaments 122, and the crossing angle between a core filament 121 and a sheath filament 122 of a sheath strand 12, the crossing angle between a sheath filament 112 of a core strand 11 and a sheath filament 122 of a sheath strand 12, and the crossing angle between sheath filaments 122 of adjacent sheath strands 12. It is noted that the crossing angle between a wrapping filament 13 and the other filament is excluded from the average value.

When the average crossing angle between adjacent filaments is 17° or more, the contact pressure between the adjacent filaments during the steel cord being pulled is high, so that the strength loss due to twisting is large. Preferably, the average crossing angle between adjacent filaments is less than 14°. When the average crossing angle is less than 14°, the strength loss due to twisting can be further reduced.

Figure 5:
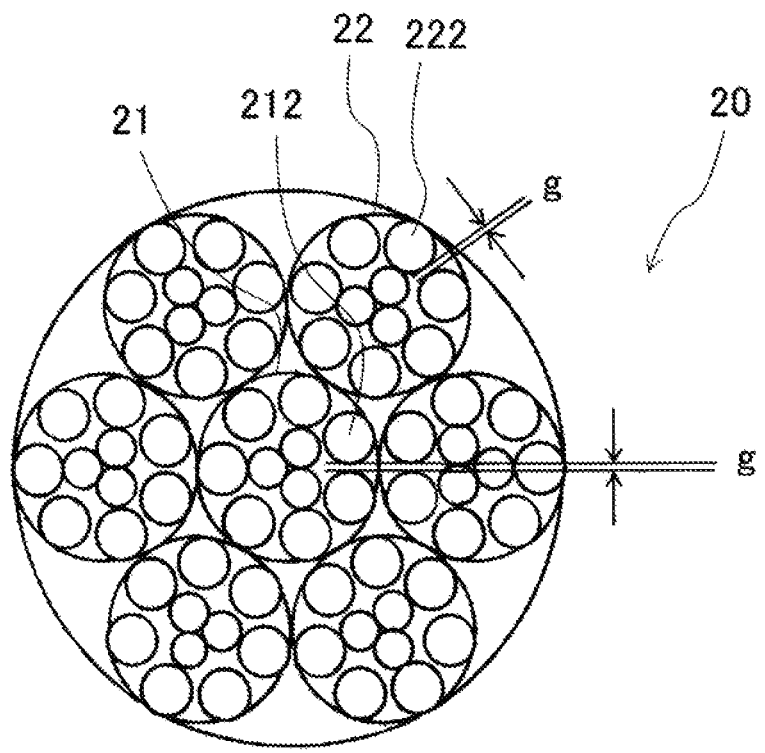
FIG. 5 illustrates a gap between adjacent sheath filaments.

In the present embodiment, a gap between adjacent sheath filaments among sheath filaments constituting a strand of the steel cord 10 is 0.065 mm or more. More specifically, as illustrated in an explanatory view of a gap between adjacent sheath filaments of the steel cord 20 in the present embodiment in FIG. 5, a gap g between adjacent sheath filaments is 0.065 mm or more for both between sheath filaments 212 forming the core strand 21 and between sheath filaments 222 forming the sheath strand 22. When the gap between adjacent sheath filaments is 0.065 mm or more, the rubber penetration of the steel cord can be improved. When the gap between adjacent sheath filaments is less than 0.065 mm, the rubber penetration is poor. Preferably, the gap is 0.065 mm or more and 0.100 mm or less.

In the steel cord 10 in the present embodiment, the twist direction of the sheath filaments 112 of the core strand 11 is preferably opposite to the twist direction of the sheath filaments 122 of the sheath strands 12. When the twist direction of the sheath filaments 112 of the core strand 11 is opposite to the twist direction of the sheath filaments 122 of the sheath strand 12, the average crossing angle between adjacent filaments can be decreased.

In the steel cord 10 in the present embodiment, the twist direction of sheath filaments 122 of one sheath strand 12 is preferably opposite to the twist direction of sheath filaments 122 of another sheath strand 12 adjacent thereto. When the twist directions of sheath filaments 122 of adjacent sheath strands 12 are opposite to each other, the average crossing angle between adjacent filaments can be decreased.

In the steel cord 10 in the present embodiment, at least some of filaments have a lamellar orientation angle in the surface layer portion of 0.0° or more and 6.0° or less, or 12.5° or more and 18.5° or less. The surface layer portion refers to a region of a filament ranging from the outermost surface to a volume fraction up to 20%. The lamellar orientation angles of the surface layer portions of all the filaments may satisfy the range described above.

The lamellar orientation angle will be described. When a filament is manufactured, a material of steel wire is drawn, then subjected to a heat treatment, a plating process, and a final wire drawing process to obtain a filament having a predetermined wire diameter. In the final wire drawing process, the crystal structure composed of ferrite and cementite is oriented so that the lamellar orientations of colonies constituting a block align in the wire drawing direction, i.e., the longitudinal direction of the filament. According to studies by the present inventors, it has been found that the lamellar orientation angle of the surface layer portion affects the resistance of the filament to a lateral pressure applied from an adjacent filament. When the lamellar orientation angle of the surface layer portion is 0.0° or more and 6.0° or less, or 12.5° or more and 18.5° or less, then the resistance to a lateral pressure applied on the filament is increased, the percent cord strength exhibition is improved, and the strength loss due to twisting is reduced. The lamellar orientation angle of the surface layer portion can be adjusted to be within the range described above by, for example, adjusting the die angle during the final wire drawing process. The lamellar orientation angle can be measured through observation of the metallographic structure of the filament.

Next, a method for manufacturing the steel cord 10 in the present embodiment will be described. For filaments constituting each strand, a material of steel wire is drawn, then subjected to a heat treatment, a plating process, and a final wire drawing process to obtain a filament having a predetermined wire diameter. After the final wire drawing process, a stress relief annealing process is performed. Preferably, the stress relief annealing process is performed at a temperature of 250° C. or higher and lower than 300° C. When the stress relief annealing process is performed at a temperature of 250° C. or higher and lower than 300° C., a steel cord having a high strength and a small strength loss due to twisting can be easily obtained. When the stress relief annealing process is performed at a temperature of lower than 250° C., the effect obtained from the stress relief annealing process is small, and the strength loss due to twisting is large. When the stress relief annealing process is performed at a temperature of 300° C. or higher, the stress relief annealing process results in an excessive annealing, which reduces the strength of the filament.

A leveling process, a processing for applying repetitive bending, for example, through rolls in a staggered arrangement, improves the residual stress and the straightness of a filament. However, repetitive bending to a filament through a leveling process increases processing strains inside the filament and increases the strength loss due to twisting. Thus, in order to reduce the strength loss due to twisting, a leveling process is not performed. Thus, the stress relief annealing process is preferably performed as a process immediately after the final wire drawing process.

Further, in consideration of the lamellar orientation angle of the surface layer portion of the filament, the drawing conditions are preferably adjusted in the final wire drawing process.

The steel cord 10 in the present embodiment is suitable for use in reinforcement of tires. However, use of the steel cord 10 in the present embodiment is not limited to tires.

EXAMPLES

The steel cords of Examples, Conventional Example and Comparative Examples shown in Tables 1 to 3 (all of which are prophetic examples) were examined for the strength loss due to twisting and the rubber penetration. For the steel cords of Examples, Conventional Example and Comparative Examples, the cord structure, the filament occupancy, the twist angle, the average crossing angle, the diameter of filaments constituting the steel cord, the tensile strength of filaments, the twist direction of filaments, and the gap between adjacent sheath filaments were described in combination in the tables. In addition, the presence or absence of a repetitive bending process, i.e., a leveling process after a final wire drawing process and the presence or absence of a stress relief annealing process after a final wire drawing process during manufacturing the filament were also described in combination.

In Tables 1 to 3, the cord diameter is a value in which the wrapping filament is excluded. Ninety or more percent cord strength exhibition evaluated for the strength loss due to twisting can be said to be a good characteristic. Thirty or more percent rubber penetration/coverage of the surface of core filaments of a core strand evaluated for rubber penetration can be said to be a good characteristic.

TABLE 1

| | | | Conventional Example | Example 1 | Example 2 | Example 3 | Example 4 | Example 5 | Example 6 |
|---|---|---|---|---|---|---|---|---|---|
| Cord Structure | | | (3 + 9) + 6 × (3 + 9) + 1 | (3 + 7) + 6 × (3 + 7) + 1 | (3 + 7) + 6 × (3 + 7) + 1 | (3 + 7) + 6 × (3 + 7) + 1 | (1 + 5) + 6 × (3 + 8) + 1 | (1 + 5) + 6 × (3 + 8) + 1 | (1 + 5) + 6 × (3 + 8) + 1 |
| Core strand | Filament diameter (mm) | Core | 0.36 | 0.31 | 0.31 | 0.31 | 0.5 | 0.5 | 0.5 |
| | | Sheath | 0.36 | 0.38 | 0.38 | 0.38 | 0.5 | 0.5 | 0.5 |
| | Tensile strength (MPa) | Core | 3079 | 3255 | 3255 | 3195 | 2438 | 2438 | 2438 |
| | | Sheath | 3079 | 3025 | 3025 | 3037 | 2438 | 2438 | 2438 |
| | Lamellar orientation angle of surface layer portion of filament (deg) | Core | 9.9 | 5.8 | 5.8 | 6.2 | 19.5 | 19.5 | 19.5 |
| | | Sheath | 9.9 | 13.0 | 13.0 | 12.8 | 27.3 | 27.3 | 27.3 |
| | Twist direction | Core | S | S | S | S | S | Z | S |
| | | Sheath | S | S | S | S | S | Z | S |
| | Gap between adjacent sheath filaments (mm) | | 0.028 | 0.076 | 0.076 | 0.076 | 0.088 | 0.088 | 0.088 |
| Sheath strand | Filament diameter (mm) | Core | 0.36 | 0.31 | 0.31 | 0.31 | 0.36 | 0.36 | 0.36 |
| | | Sheath | 0.36 | 0.38 | 0.38 | 0.38 | 0.36 | 0.36 | 0.36 |
| | Tensile strength (MPa) | Core | 3079 | 3255 | 3255 | 3195 | 3079 | 3079 | 3079 |
| | | Sheath | 3079 | 3025 | 3025 | 3037 | 3079 | 3079 | 3079 |
| | Lamellar orientation angle of surface layer portion of filament (deg) | Core | 9.9 | 5.8 | 5.8 | 6.2 | 8.3 | 8.3 | 8.3 |
| | | Sheath | 9.9 | 13.0 | 13.0 | 12.8 | 11.6 | 11.6 | 11.6 |
| | Twist direction | Core | S | S | S | S | S | S | S/Z, alternately |
| | | Sheath | S | S | S | S | S | S | S/Z, alternately |
| | Gap between adjacent sheath filaments (mm) | | 0.028 | 0.076 | 0.076 | 0.076 | 0.075 | 0.075 | 0.075 |
| cord | Cord diameter (mm) | | 4.49 | 4.29 | 4.29 | 4.29 | 4.49 | 4.49 | 4.49 |
| | Filament occupancy (%) | | 54.1 | 49.4 | 49.4 | 49.4 | 49.8 | 49.8 | 49.8 |
| | Twist angle (deg) | | 78.2 | 82.4 | 82.4 | 82.4 | 81.3 | 81.3 | 81.3 |
| | Average crossing angle (deg) | | 14.6 | 16.1 | 16.1 | 16.1 | 16.2 | 12.9 | 6.1 |
| Presence of repetitive bending after wire drawing process | | | Yes | Yes | Yes | No | Yes | Yes | Yes |
| Presence of heat treatment after wire drawing process | | | No | No | Yes | No | No | No | No |
| Percent cord strength exhibition (%) | | | 89.9 | 92.1 | 93.7 | 93.2 | 91.2 | 91.8 | 93.0 |
| Rubber penetration/coverage of core surface of core strand (%) | | | 1 | 49 | 48 | 50 | 45 | 46 | 44 |

TABLE 2

| | | | Comparative Example 1 | Comparative Example 2 | Comparative Example 3 | Comparative Example 4 | Comparative Example 5 | Comparative Example 6 |
|---|---|---|---|---|---|---|---|---|
| Cord structure | | | (3 + 8) + 7 × (3 + 7) + 1 | (3 + 7) + 6 × (3 + 7) + 1 | (3 + 7) + 6 × (3 + 7) + 1 | (3 + 8) + 7 × (3 + 7) + 1 | (3 + 8) + 7 × (3 + 7) + 1 | (3 + 8) + 7 × (3 + 8) + 1 |
| Core strand | Filament diameter (mm) | Core | 0.41 | 0.31 | 0.31 | 0.41 | 0.41 | 0.43 |
| | | Sheath | 0.45 | 0.41 | 0.41 | 0.45 | 0.45 | 0.43 |

TABLE 2-continued

|  |  |  | Comparative Example 1 | Comparative Example 2 | Comparative Example 3 | Comparative Example 4 | Comparative Example 5 | Comparative Example 6 |
|---|---|---|---|---|---|---|---|---|
|  | Tensile strength (MPa) | Core | 2935 | 3086 | 3086 | 2935 | 2935 | 2820 |
|  |  | Sheath | 2648 | 2838 | 2838 | 2648 | 2648 | 2820 |
|  | Lamellar orientation angle of surface layer portion of filament (deg) | Core | 13.1 | 8.5 | 8.5 | 13.1 | 13.1 | 15.2 |
|  |  | Sheath | 18.3 | 14.3 | 14.3 | 18.3 | 18.3 | 15.2 |
|  | Twist direction | Core | S | S | S | S | S | Z |
|  |  | Sheath | S | S | S | S | S | Z |
|  | Gap between adjacent sheath filaments (mm) |  | 0.060 | 0.057 | 0.057 | 0.060 | 0.060 | 0.089 |
| Sheath strand | Filament diameter (mm) | Core | 0.28 | 0.31 | 0.31 | 0.28 | 0.28 | 0.325 |
|  |  | Sheath | 0.37 | 0.41 | 0.41 | 0.37 | 0.37 | 0.325 |
|  | Tensile strength (MPa) | Core | 3225 | 3086 | 3086 | 3454 | 3454 | 3132 |
|  |  | Sheath | 3049 | 2838 | 2838 | 3049 | 3049 | 3132 |
|  | Lamellar orientation angle of surface layer portion of filament (deg) | Core | 6.5 | 8.5 | 8.5 | 4.6 | 4.6 | 8.5 |
|  |  | Sheath | 10.6 | 14.3 | 14.3 | 10.6 | 10.6 | 8.5 |
|  | Twist direction | Core | S | S | S | S | S | Z |
|  |  | Sheath | S | S | S | S | S | Z |
|  | Gap between adjacent sheath filaments (mm) |  | 0.052 | 0.057 | 0.057 | 0.052 | 0.052 | 0.067 |
| cord | Cord diameter (mm) |  | 4.47 | 4.46 | 4.46 | 4.47 | 4.47 | 4.49 |
|  | Filament occupancy (%) |  | 52.4 | 51.5 | 51.5 | 52.4 | 52.4 | 50.5 |
|  | Twist angle(deg) |  | 81.6 | 82.7 | 82.7 | 81.1 | 77.9 | 78.3 |
|  | Average crossing angle(deg) |  | 16.5 | 16.3 | 16.3 | 16.4 | 21.0 | 18.0 |
| Presence of repetitive bending after wire drawing process |  |  | Yes | Yes | Yes | Yes | Yes | Yes |
| Presence of heat treatment after wire drawing process |  |  | No | No | Yes | No | No | No |
| Percent cord strength exhibition (%) |  |  | 91.2 | 92.1 | 95.2 | 91.0 | 86.7 | 88.9 |
| Rubber penetration/coverage of core surface of core strand (%) |  |  | 11 | 16 | 16 | 11 | 8 | 32 |

TABLE 3

|  |  |  | Comparative Example 7 | Example 7 | Comparative Example 8 | Comparative Example 9 | Example 8 | Comparative Example 10 | Comparative Example 11 | Comparative Example 12 | Example 9 |
|---|---|---|---|---|---|---|---|---|---|---|---|
| Cord structure |  |  | (3 + 7) + 6 × (3 + 7) + 1 | (3 + 7) + 6 × (3 + 7) + 1 | (3 + 9) + 6 × (3 + 9) + 1 | (3 + 7) + 6 × (3 + 7) + 1 | (3 + 7) + 6 × (3 + 7) + 1 | (3 + 7) + 6 × (3 + 7) + 1 | (3 + 7) + 6 × (3 + 7) + 1 | (3 + 9) + 6 × (3 + 9) + 1 | (3 + 7) + 6 × (3 + 7) + 1 |
| Core strand | Filament diameter (mm) | Core | 0.355 | 0.33 | 0.355 | 0.31 | 0.31 | 0.31 | 0.31 | 0.38 | 0.31 |
|  |  | Sheath | 0.39 | 0.38 | 0.355 | 0.38 | 0.38 | 0.38 | 0.4 | 0.35 | 0.38 |
|  | Tensile strength (MPa) | Core | 3285 | 3255 | 3100 | 3255 | 3255 | 3500 | 3086 | 3100 | 3255 |
|  |  | Sheath | 3285 | 3025 | 3100 | 3025 | 3025 | 3300 | 2838 | 3100 | 3025 |
|  | Lamellar orientation angle of surface layer portion of filament(deg) | Core | 7.6 | 6.1 | 9.6 | 6.9 | 5.8 | 4.7 | 8.5 | 10.3 | 4.7 |
|  |  | Sheath | 8.4 | 13.0 | 9.6 | 11.1 | 13.0 | 8.0 | 13.9 | 9.5 | 15.2 |
|  | Twist direction | Core | S | S | S | S | S | S | S | S | S |
|  |  | Sheath | S | S | S | S | S | S | S | S | S |
|  | Gap between adjacent sheath filaments (mm) |  | 0.111 | 0.093 | 0.028 | 0.075 | 0.075 | 0.075 | 0.063 | 0.097 | 0.076 |
| Sheath strand | Filament diameter (mm) | Core | 0.355 | 0.33 | 0.355 | 0.31 | 0.31 | 0.31 | 0.31 | 0.38 | 0.31 |
|  |  | Sheath | 0.39 | 0.38 | 0.355 | 0.38 | 0.38 | 0.38 | 0.4 | 0.35 | 0.38 |
|  | Tensile strength (MPa) | Core | 3285 | 3255 | 3100 | 3255 | 3255 | 3500 | 3086 | 3100 | 3255 |
|  |  | Sheath | 3285 | 3025 | 3100 | 3025 | 3025 | 3300 | 2838 | 3100 | 3025 |
|  | Lamellar orientation angle of surface layer portion of filament (deg) | Core | 7.6 | 6.1 | 9.6 | 6.9 | 5.8 | 4.7 | 8.5 | 10.3 | 4.7 |
|  |  | Sheath | 8.4 | 13.0 | 9.6 | 11.1 | 13.0 | 8.0 | 13.9 | 9.5 | 15.2 |

TABLE 3-continued

|  |  |  | Comparative Example 7 | Example 7 | Comparative Example 8 | Comparative Example 9 | Example 8 | Comparative Example 10 | Comparative Example 11 | Comparative Example 12 | Example 9 |
|---|---|---|---|---|---|---|---|---|---|---|---|
|  | Twist direction | Core | S | S | S | S | S | S | S | S | S |
|  |  | Sheath | S | S | S | S | S | S | S | S | S |
|  | Gap between adjacent sheath filaments (mm) |  | 0.111 | 0.093 | 0.028 | 0.075 | 0.075 | 0.075 | 0.063 | 0.097 | 0.076 |
| cord | Cord diameter (mm) |  | 4.63 | 4.41 | 4.42 | 4.28 | 4.28 | 4.28 | 4.40 | 4.56 | 4.29 |
|  | Filament occupancy (%) |  | 47.0 | 48.1 | 54.1 | 49.6 | 49.6 | 49.6 | 50.8 | 47.7 | 49.4 |
|  | Twist angle (deg) |  | 83.1 | 82.2 | 79.7 | 84.1 | 83.1 | 82.7 | 82.8 | 80.2 | 82.4 |
|  | Average crossing angle (deg) |  | 16.4 | 16.6 | 14.8 | 16.5 | 16.3 | 17.3 | 16.2 | 15.5 | 16.1 |
| Presence of repetitive bending after wire drawing process |  |  | Yes | Yes | Yes | Yes | Yes | Yes | Yes | No | No |
| Presence of heat treatment after wire drawing process |  |  | No | No | No | No | No | No | No | Yes | Yes |
| Percent cord strength exhibition (%) |  |  | 90.1 | 91.3 | 90.7 | 92.1 | 91.9 | 89.4 | 92.3 | 90.9 | 94.8 |
| Rubber penetration/coverage of core surface of core strand (%) |  |  | 95 | 78 | 1 | 44 | 43 | 45 | 24 | 83 | 48 |

As can be seen from Table 1, the steel cords of Examples 1 to 6, where the filament occupancy, the cord twist angle, the average crossing angle between adjacent filaments other than wrapping filament, and the gap between adjacent sheath filaments constituting the strand are in the predetermined ranges, had an improved percent cord strength exhibition and an improved rubber penetration/coverage of the surface of the core filaments of the core strand as compared with Conventional Examples.

When looking more specifically at Examples 1 to 6, Example 2 is an example where a stress relief annealing process was performed for 3 seconds at 275° C. after the final wire drawing process in contrast to Example 1, and the percent cord strength exhibition was improved as compared with Example 1.

Example 3 is an example where a leveling process was not performed after the final wire drawing process in contrast to Example 1, and the percent cord strength exhibition was improved as compared with Example 1.

Example 4 is an example of a steel cord having a different cord structure than that of Example 1. In Example 5, where the twist direction of the sheath filaments of the core strand is opposite to the twist direction of the sheath filaments of the sheath strand in contrast to Example 4, the crossing angle was reduced and the percent cord strength exhibition was improved as compared with Example 4.

In Example 6, where the twist direction of sheath filaments of one sheath strand is opposite to the twist directions of sheath filaments of another sheath strand adjacent thereto in contrast to Example 4, the crossing angle was reduced and the percent cord strength exhibition was improved as compared with Example 4.

In each Comparative Examples 1 to 4 shown in Table 2, where the strand has a gap between adjacent sheath filaments of less than 0.065 mm, the rubber coverage of the core surface of the core strand was unsatisfactory.

In Comparative Example 5, where the strand has a gap between adjacent sheath filaments of less than 0.065 mm, the rubber coverage of the core surface of the core strand was unsatisfactory. Furthermore, since the twist angle was 78° or less and the average crossing angle was 17° or more, the percent cord strength exhibition was unsatisfactory.

In Comparative Example 6, where the average crossing angle was 17° or more, the percent cord strength exhibition was unsatisfactory.

Comparative Example 7 and Example 7 shown in Table 3 are examples comparing the difference in the filament occupancy. In Example 7, where the filament occupancy satisfied the predetermined range, the percent cord strength exhibition was improved as compared with Comparative Example 7. In Comparative Example 7, where the filament occupancy was small, the cord diameter was larger than that of Conventional Example. This results in thickening of the rubber reinforcement layer, which is disadvantageous in view of tire weight saving.

In Comparative Example 8, where the filament occupancy exceeded the predetermined range, the gap between adjacent sheath filaments was small and the rubber penetration was poor.

Comparative Example 9 and Example 8 are examples comparing the difference in the cord twist angle. In Comparative Example 9, where the cord twist angle was 84° or more, the twist properties were unstable.

In Comparative Example 10, where the average crossing angle was 17° or more, the strength loss due to twisting was large.

In Comparative Example 11, where the gap between adjacent sheath filaments was less than 0.065 mm, the rubber penetration was poor.

In Comparative Example 12, where the filament occupancy was less than 48%, the cord diameter was large.

In Example 9, an example where a stress relief annealing process was performed for 3 seconds at 275° C. without performing a leveling process after the final wire drawing process, the percent cord strength exhibition was improved as compared with Example 1.

DESCRIPTION OF SYMBOLS

10 Steel cord
11 Core strand
12 Sheath strand
13 Wrapping filament
20 Steel cord
21 Core strand
22 Sheath strand
111 Core filament
112 Sheath filament
121 Core filament 122 Sheath filament
211 Core filament
212 Sheath filament
221 Core filament
222 Sheath filament

The invention claimed is:

1. A steel cord for reinforcing a rubber article, comprising a plurality of twisted strands in a multi-twisted structure, each strand comprising a plurality of twisted filaments in two or more layers, wherein at least some of the filaments have a tensile strength of 3,000 MPa or more; wherein the steel cord satisfies the following:
 a filament occupancy of 48% or more and less than 54%;
 a cord twist angle of 78° or more and less than 84°;
 an average crossing angle between adjacent filaments other than wrapping filaments of less than 17°; and
 a gap between adjacent sheath filaments constituting the strand of 0.065 mm or more.

2. The steel cord for reinforcing a rubber article according to claim 1, wherein the average crossing angle between the adjacent filaments is less than 14°.

3. The steel cord for reinforcing a rubber article according to claim 2, wherein the multi-twisted structure is a 1+n (n=6 or 7) structure comprising one core strand and six to seven sheath strands twisted around the core strand.

4. The steel cord for reinforcing a rubber article according to claim 3, wherein a twist direction of the sheath filaments of the core strand is opposite to a twist direction of the sheath filaments of the sheath strands.

5. The steel cord for reinforcing a rubber article according to claim 3, wherein a twist direction of sheath filaments of one of the sheath strands is opposite to a twist direction of sheath filaments of another sheath strand adjacent thereto.

6. The steel cord for reinforcing a rubber article according to claim 3, wherein a lamellar orientation angle in a surface layer portion of at least some of the filaments is 0.0° or more and 6.0° or less, or 12.5° or more and 18.5° or less.

7. The steel cord for reinforcing a rubber article according to claim 2, wherein a lamellar orientation angle in a surface layer portion of at least some of the filaments is 0.0° or more and 6.0° or less, or 12.5° or more and 18.5° or less.

8. A tire using the steel cord for reinforcing a rubber article according to claim 2 for reinforcement thereof.

9. The steel cord for reinforcing a rubber article according to claim 1, wherein the multi-twisted structure is a 1+n (n=6 or 7) structure comprising one core strand and six to seven sheath strands twisted around the core strand.

10. The steel cord for reinforcing a rubber article according to claim 9, wherein a twist direction of the sheath filaments of the core strand is opposite to a twist direction of the sheath filaments of the sheath strands.

11. The steel cord for reinforcing a rubber article according to claim 10, wherein a lamellar orientation angle in a surface layer portion of at least some of the filaments is 0.0° or more and 6.0° or less, or 12.5° or more and 18.5° or less.

12. The steel cord for reinforcing a rubber article according to claim 9, wherein a twist direction of sheath filaments of one of the sheath strands is opposite to a twist direction of sheath filaments of another sheath strand adjacent thereto.

13. The steel cord for reinforcing a rubber article according to claim 12, wherein a lamellar orientation angle in a surface layer portion of at least some of the filaments is 0.0° or more and 6.0° or less, or 12.5° or more and 18.5° or less.

14. The steel cord for reinforcing a rubber article according to claim 9, wherein a lamellar orientation angle in a surface layer portion of at least some of the filaments is 0.0° or more and 6.0° or less, or 12.5° or more and 18.5° or less.

15. A tire using the steel cord for reinforcing a rubber article according to claim 9 for reinforcement thereof.

16. The steel cord for reinforcing a rubber article according to claim 1, wherein a lamellar orientation angle in a surface layer portion of at least some of the filaments is 0.0° or more and 6.0° or less, or 12.5° or more and 18.5° or less.

17. A tire using the steel cord for reinforcing a rubber article according to claim 1 for reinforcement thereof.

18. A method for manufacturing a steel cord for reinforcing a rubber article, wherein the steel cord is the steel cord for reinforcing a rubber article according to claim 1, comprising a plurality of twisted strands in a multi-twisted structure, each strand comprising a plurality of twisted filaments in two or more layers;
 the method comprising subjecting at least some of the filaments constituting the strand after a final wire drawing process to a stress relief annealing process at 250° C. or higher and lower than 300° C.

19. The method for manufacturing a steel cord for reinforcing a rubber article according to claim 18, wherein the stress relief annealing process is performed after the final wire drawing process without a leveling process.

* * * * *